(12) United States Patent
Li et al.

(10) Patent No.: US 12,276,257 B2
(45) Date of Patent: Apr. 15, 2025

(54) WIND POWER GENERATION SYSTEM

(71) Applicants: Jianyong Li, Beijing (CN); Guangze Jia, Beijing (CN)

(72) Inventors: Jianyong Li, Beijing (CN); Guangze Jia, Beijing (CN); Shuming Yan, Beijing (CN)

(73) Assignees: Jianyong Li, Beijing (CN); Guangze Jia, Beijing (CN)

( * ) Notice: Subject to any disclaimer, the term of this patent is extended or adjusted under 35 U.S.C. 154(b) by 0 days.

(21) Appl. No.: 18/220,921

(22) Filed: Jul. 12, 2023

(65) Prior Publication Data
US 2025/0020100 A1    Jan. 16, 2025

(51) Int. Cl.
*F03D 3/00*     (2006.01)
*F03D 9/11*     (2016.01)
*F03D 15/00*    (2016.01)

(52) U.S. Cl.
CPC ............... *F03D 3/009* (2023.08); *F03D 9/11* (2016.05); *F03D 15/205* (2023.08); *F05B 2250/712* (2013.01); *F05B 2260/42* (2013.01)

(58) Field of Classification Search
CPC .......... F03D 3/009; F03D 9/11; F03D 15/205; F05B 2250/712; F05B 2260/42
See application file for complete search history.

(56) References Cited

U.S. PATENT DOCUMENTS

2020/0378363 A1 * 12/2020 Lee ........................ G05F 1/67

* cited by examiner

*Primary Examiner* — Joseph Ortega
(74) *Attorney, Agent, or Firm* — Reichel Stohry Dean LLP; Mark C. Reichel; Natalie J. Dean (57) ABSTRACT

The application provides a wind power generation system. The application discloses one or several set of power generation units, which generate power by driving the power generation units through the airflow generated by the natural environment or the carrier device, and then the control module outputs the power to the power storage device, and then supplies power to each power-consuming equipment by the diverter connected to the power output terminal of the power storage device, respectively. The internal structure of a turbofan blade of this application has a cavity for repeated impact of airflow, which can utilize a single inlet air to generate several drives to the blades, so that tiny wind can provide more stable power supply for various power-consuming facilities, and the power generation system of this application is less affected by external environmental factors.

16 Claims, 5 Drawing Sheets

WIND POWER GENERATION SYSTEM

TECHNICAL FIELD

The application relates to the technical field of new energy, particularly relates to a wind power generation system.

BACKGROUND

Existing wind power generation devices need to be arranged in areas with fixed wind direction and strong wind force, such as mountain tops, plains or seas. Therefore, the installation and maintenance costs of existing wind power generation devices are high, and the cost of electric energy transmission is high. Moreover, the existing wind power generation device can provide effective electric energy output only after the wind power reaches a certain level, and its power generation efficiency is not high.

Sufficient spacing should be reserved between the wind turbines arranged in the open area, to avoid affecting the operation of the rear generator set caused by the turbulence fluctuation of the blade airflow. Therefore, the existing wind turbines have a limited number of units per unit area, which does not fully utilize the wind energy.

SUMMARY

This application aims to overcome the defect in the prior art, and provides a wind power generation system, this application forms a cavity space within the turbofan blade structure that can be repeatedly impacted by airflow, so that the reflection of the airflow from the cavity can be utilized to improve the driving efficiency of wind power on the blade, thereby driving the rotation of the blade to generate power through a smaller wind volume. This application specifically adopts the following technical solutions.

First, in order to achieve the above purpose, a wind power generation system is proposed, which comprises: a turbofan blade structure having a transmission shaft perpendicular to a direction of environment airflow, the turbofan blade structure being driven by the environment airflow to rotate with the transmission shaft as a rotation center; a speed control mechanism, wherein one end of the speed control mechanism is connected to the transmission shaft and the other end of the speed control mechanism is driven by the transmission shaft and outputs torque; a generator, wherein a rotor drive shaft of the generator is connected to the speed control mechanism, and is driven by the torque output by the speed control mechanism to generate power; an indicator that is connected between the generator and a cable and conducts or disconnects a power output path between the generator and the cable.

Optionally, according to any one of the wind power generation systems described above, wherein the turbofan blade structure is arranged in squares, airports, building exteriors, green areas, farmland surroundings, and open areas.

Optionally, according to any one of the wind power generation systems described above, it further comprises: a power storage device connected to the cable for receiving and storing power output by each generator; and a diverter connected to a power output terminal of the power storage device and outputting power to a power-consuming equipment.

Optionally, according to any one of the wind power generation systems described above, wherein the indicators that are connected to respective generator are connected in series by the cables, and an isolating protective switch is also connected in series in the cables.

Optionally, according to any one of the wind power generation systems described above, wherein the turbofan blade structure comprises, fixedly connected to the transmission shaft: blades, wherein at least two blades are included and arranged oppositely and concaved toward a rotation center of the turbofan blade structure, and a cavity is formed and enclosed by each blade for repeated impact and diversion of airflow, the blades being driven by the airflow to drive the transmission shaft at its bottom to rotate synchronously; a blade connection structure surrounded by the blades and connected between the each blade; the transmission shaft is fixedly connected to the bottom of the blade or fixedly connected to a rotation center position of the blade connection structure.

Optionally, according to any one of the wind power generation systems described above, wherein each the blade is configured with an inward concave curved surface structure respectively, and has a first inward concave curvature along a rotation center direction of the transmission shaft and has a second inward concave curvature along a rotation circumference of the transmission shaft, the second inward concave curvature is not less than the first inward concave curvature; at least an overlap area of ⅓ to ½ of a cross-sectional area of an inward concave surface is provided between two blades.

Optionally, according to any one of the wind power generation systems described above, wherein the blade connection structure is a plane or connection rib parallel to a rotation direction of the blade.

Optionally, according to any one of the wind power generation systems described above, wherein a one-way transmission device is further connected between the turbofan blade structure and the generator, the one-way drive device comprising: a blade drive layer driven by the transmission shaft at a bottom of the turbofan blade structure, and synchronized with a speed of the turbofan blade structure; a motor transmission layer arranged within the blade drive layer, coaxial with the blade drive layer and driving the generator rotor; inner coupling elastic member protruding from an outer circumference surface of the motor transmission layer, wherein a bottom of the inner coupling elastic member is elastically connected to the motor transmission layer, and a top of the inner coupling elastic member abuts against an inner circumference of the blade drive layer when the speed of the turbofan blade structure exceeds the speed of the motor transmission layer, and is retracted inwardly or bounced back and forth along the inner circumference of the blade drive layer, slides relatively with the blade drive layer and disconnects the transmission connection of the turbofan blade structure, when the speed of the motor transmission layer exceeds the corresponding speed of the turbofan blade structure; an outer layer one-way coupling member evenly arranged along the inner circumference of the blade drive layer, having a wedge-shaped projection along the rotation direction of the turbofan blade structure, wherein the wedge-shaped projection abuts against the top of the inner coupling elastic member when the speed of the turbofan blade structure exceeds the speed of the motor transmission layer, and the top of the inner coupling elastic member slides unidirectionally from a top of the wedge-shaped protrusion to its bottom when the speed of the motor transmission layer exceeds the corresponding speed of the turbofan blade structure.

Optionally, according to any one of the wind power generation systems described above, wherein the generator is a self-excited constant voltage generator having an excitation device automatic control system connected between a main generator stator coil and an excitation rotor, and regulating in reverse an excitation current of a rectifier bridge connected to the excitation rotor according to a deviation value of the output voltage of the main generator stator coil, keeps the output voltage of the self-excited constant voltage generator stable.

Optionally, according to any one of the wind power generation systems described above, wherein the rectifier bridge is coaxially arranged between the excitation rotor and a main generator rotor, electrically connected to the excitation rotor as well as the main generator rotor, and maintains in synchronous operation.

Beneficial Effects

The application generates power by driving the power generation units through the airflow generated by the natural environment or the carrier device, and then the control module outputs the power to the power storage device, and then supplies power to each power-consuming equipment by the diverter connected to the power output terminal of the power storage device, respectively. The internal structure of a turbofan blade of this application has a cavity for repeated impact of airflow, which can utilize a single inlet air to produce several drives to the blades, so that tiny wind can provide more stable power supply for various power-consuming facilities, the power generation system of this application is less affected by external environmental factors.

Other features and advantages of the application will be set forth in the subsequent specification, and, partially become obvious from the description, or may be understood by implementing the application.

BRIEF DESCRIPTION OF THE DRAWINGS

The drawings are used to provide a further understanding of this application, form part of the specification and, and explain the application together with the embodiments of the application, but do not constitute a limitation to the application. In the drawings.

In the drawings, 1 indicates a power generation unit; 2 indicates a turbofan blade structure; 201 indicates a blade; 202 indicates a blade connection structure; 21 indicates a transmission shaft; 22 indicates a speed control mechanism; 23 indicates a one-way drive device; 24 indicates a rotor drive shaft of the generator; 231 indicates a blade drive layer; 232 indicates a motor transmission layer; 233 indicates an inner coupling elastic member; 234 indicates an outer one-way coupling member; 3 indicates a generator; 31 indicates a rotating rectifier module; 4 indicates control module; 5 indicates power storage device; 6 indicates indicator; 7 indicates roadway power-consuming equipment; 8 indicates diverter; 9 indicates isolating protective switch; and 10 indicates cable.

DETAILED DESCRIPTION

In order to make the purpose and technical solution of the embodiments of the application clearer, the technical solution of the embodiments of the application will be described clearly and completely below in conjunction with the drawings of the embodiments of the application. Obviously, the described embodiments are a part of the embodiments of the present application, and not all of the embodiments. Based on the described embodiments of the application, all other embodiments obtained by a person of ordinary skill in the art without creative labor fall within the scope of protection of the application.

Those skilled in the art can understand that unless otherwise defined, all terms (comprising technical terms and scientific terms) used herein have the same meanings as common understanding of ordinary skill in the art to which the application belongs. It should also be understood that terms such as those defined in general dictionaries should be understood to have a meaning consistent with the meaning in the context of the prior art, and unless defined as herein, are not to be interpreted in an idealized or overly formal sense explain.

The meaning of "and/or" described in the application refers to that the situations that each exists alone or both exist simultaneously are all included.

The meaning of "inner" and "outer" described in the application refers to that the direction from the outer wall of the turbofan blade structure to the internal transmission shaft is "inner", and the opposite is "outer", with respect to the turbofan blade structure itself; it is not a specific limitation on the mechanism of the device mechanism of this application.

The meaning of "left" and "right" described in the application refers to that when the user is facing the forward direction of the vehicle, the left side of the user is the left side, and the right side of the user is the right side, and it is not a specific limitation of the device mechanism of the application.

The meaning of "connection" described in the application can be a direct connection between components or an indirect connection between components through other components.

The meaning of "up" and "down" described in the application refers to that when the user is facing the forward direction of the vehicle, the direction from the chassis of the vehicle to the roof of the vehicle is "up", and the opposite is "down", which is down, and is not a specific limitation of the device mechanism of the application.

Figure 1:
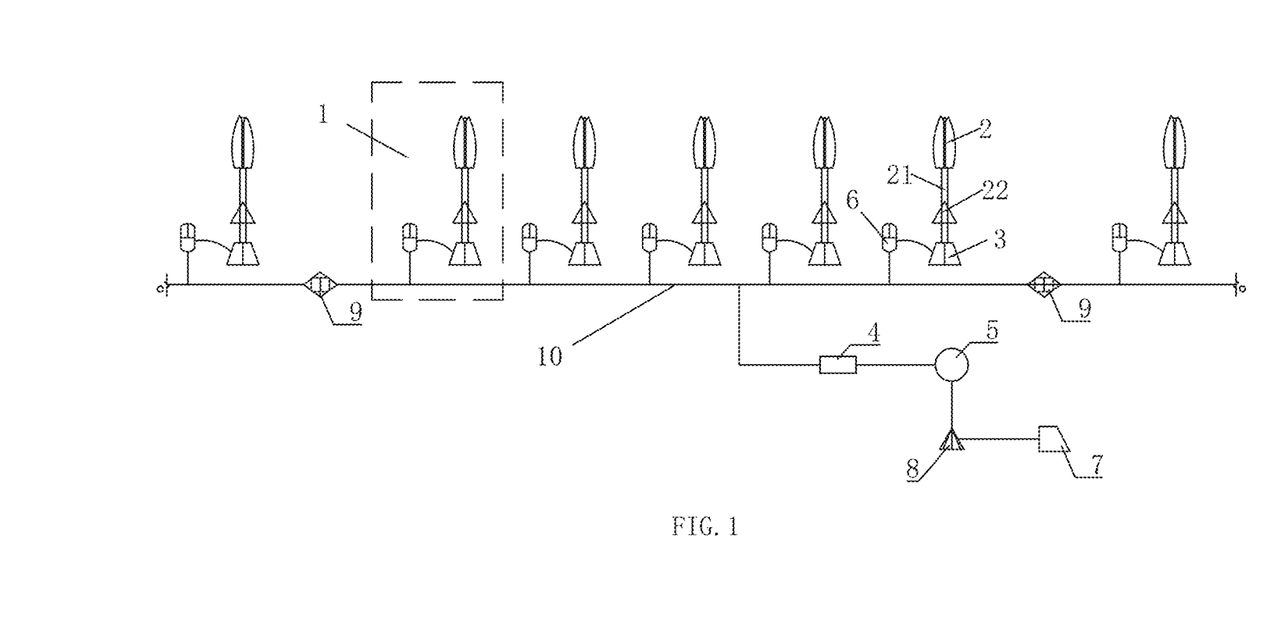
FIG. 1 is a schematic diagram of the wind power generation system of the application.
Figure 3:
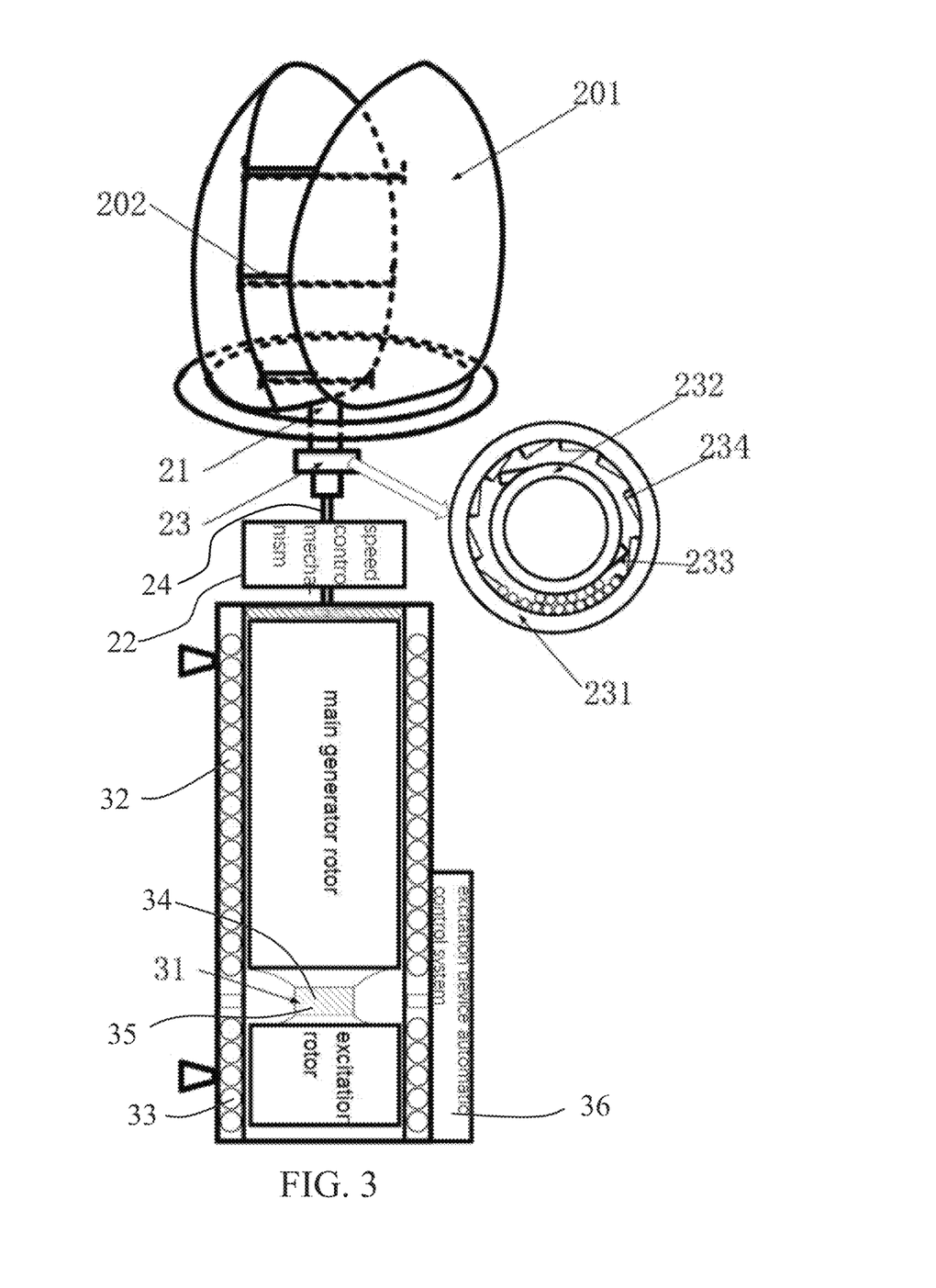
FIG. 3 is a schematic diagram of the mechanical structure corresponding to the power generation unit in the system of FIG. 1.

FIG. 1 and FIG. 3 provide specific configuration way of the wind power generation system of the application, which can be mounted around open areas such as squares, airport aprons, building exteriors, green areas, farmlands, etc., The long size and the installation spacing of the turbofan blade structure can be adjusted accordingly according to the space conditions of the installation location. The system of the application generates power through several turbofan blade structures driven by tiny airflow in the environment, and achieves the power output to the power storage device through the control module, thus implementing power supply to various types of power-consuming equipment 7 or the power grid, by means of the power storage device and diverting by the diverter, making full utilization of the wind energy in various types of environmental space to achieve power generation.

Wherein, each turbofan blade structure can be connected respectively to the generators and drive the generators independently, and each generator are connected in series by cables 10 to achieve electric energy transmission, and the cable 10 can be further connected in series with isolating protective switch 9 to provide overvoltage protection, load protection.

The wind power generation system of the application may have several turbofan blade structures arranged at any position in the environment in a manner perpendicular to the wind direction, with each turbofan blade structure as a point-to-point independent power generation unit to generate power through a small amount of wind. Each power generation unit of the application may be configured separately to comprise:

- a turbofan blade structure 2 having a transmission shaft 21 perpendicular to a direction of environment airflow, wherein the turbofan blade structure can be mounted directly in squares, airport aprons, a building exterior, green areas, farmland surroundings, open areas, and its blades are capable of being driven to rotate the transmission shaft 21 at the rear end of the blades by the air pressure generated during vehicle travel;
- a speed control mechanism 22 connected to the transmission shaft 21 in the manner of FIG. 1 and the other end driven by the transmission shaft 21 for outputting torque;
- a generator 3, wherein a rotor drive shaft 24 of the generator is connected to the speed control mechanism 22, driven by the output torque of the speed control mechanism to generate power;
- an indicator 6 including a switch connected between the generator 3 and the cable 10 and connects or disconnects a power output path between the generator and the cable.

The turbofan blade structure of the application is directly fixed by a bottom bracket and set up vertically in squares, airport aprons, building exteriors, green areas, farmland surroundings, and open areas. The turbofan blade structure may form a cavity for repeated impact and diversion of airflow enclosed by inner of the blades, and achieve the driving of the generator by utilizing a tiny airflow, and drive the rotor drive shaft of the generator 3 to operate in order to provide power output.

In order to coordinate the power output among the power generating units, to achieve a balanced power supply to the external power-consuming equipment or to feed the power output of each unit into the grid according to a unified standard, the application may also correspondingly add to the system:

A control module 4 connected to a generator output terminal and controlling the generator to output power to the power-consuming equipment 7 for power supply and/or to output power to the power storage unit 5 for charging.

A power storage device 5 connected to the control module, for receiving and storing the power output by the power generation unit.

A diverter 8 connected to a power output terminal of the power storage device 5, to divert, i.e., route power to the power-consuming equipment 7 or to the grid.

Figure 2:
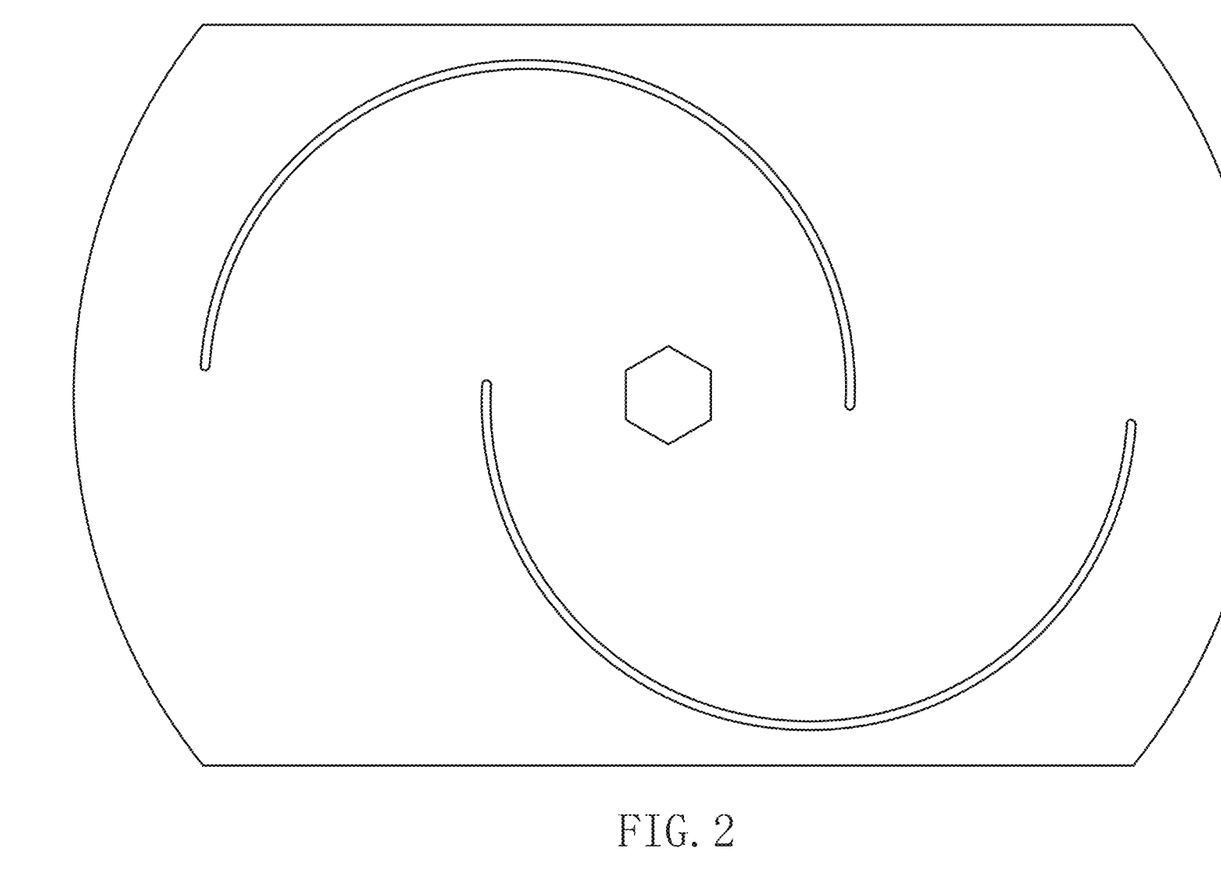
FIG. 2 is a diagram of the turbofan blade structure adopted in the application in a top view perspective.

In the application, the turbofan blade structure may be configured as shown in the upper part of FIG. 3 to comprise, fixedly connected to the transmission shaft 21: at least two blades 201 arranged opposite to each other, and a blade connection structure 202 connected between the blades 201 surrounded by the fan blades 201. As shown in FIG. 2, each blade 201 in the above structure is configured with an inward concave curved surface structure, and an inner normal direction of the inward concave curved surface structure of each blade is opposite to each other, each facing the center of the rotating shaft of the turbofan blade structure 2. Taking the turbofan blade structure consisting of two blades as an example in FIG. 2, the two inward concave surfaces of the inward concave curved surface structures are arranged face to face at 180 degrees, and the two inward concave surfaces are staggered to form the air inlet and outlet of the turbofan, and the inward concave surfaces of the blades between the air inlet and outlet are closed to form a relatively closed s-shaped space for the airflow to repeatedly retrace between the two blade curved surfaces and impact the inward concave surfaces of the blades to repeatedly provide the driving torque for the blades. In the structure shown in FIG. 3, the transmission shaft 21 for outputting torque to drive the generator may be fixedly connected to a bottom of the blades 201 by an annular bracket structure, and it may also be fixedly connected to the rotation center position inside the blade connection structure 202 by transverse plate correspondingly connected to each blade in the turbofan fan structure using the transverse plate as the blade connection structure 202.

The turbofan blade structure is tested in the manner of FIG. 2 and it can be seen that the enclosed area between the blades arranged opposite to each other is able to reflect and veer the airflow entering from a single side. During the airflow veering process, impacting the opposite blade can provide a secondary drive to the overall structure of the turbofan, so only relying on the tiny airflow in the environment can drive the blade to achieve torque output to the generator. The speed control mechanism of the application is able to reduce the blade speed appropriately and thus increase the output torque to the generator to further improve the power generation efficiency.

In other implementations, the application may also set three, four, or even five or six blade structures. The number of blades can be flexible, as long as the angles between the blades are staggered to leave a gap for air inlet, and fluidly connected to each other at a position close to t the rotation center axis to form a relatively closed cavity, and it is possible for the air to retrace back and forth in the cavity from the air inlet on the outside of the blade on one side and flow out from the air outlet on the outside of the blade on the other side, then a driving effect similar to the relatively staggered installation of the two blades in FIG. 2 can be achieved.

Regardless of the number of blades to be installed in each turbofan blade structure, the application can configure each blade to have the following inward concave surface structure by injection molding or otherwise processing method: the inward concave surface is integrally perpendicular to the wind direction, and its outer side cooperates with the adjacent blades to form a stretched and extended "pot" shape having a long longitudinal air inlet gap. The blade structure has a first inward concave curvature along a straight line parallel to the rotation center of the transmission shaft 21, and, at the same time, it has a second inward concave curvature along the rotation circumference of the transmission shaft 21, the bending radius corresponding to the first inward concave curvature is generally significantly larger than the bending radius corresponding to the second inward concave curvature, i.e., the second inward concave curvature is no less than the first inward concave curvature, and the blade is bent more along the rotation shaft circumference to form a wind rebound surface that is enclosed more tightly, to increase the wind torque output, and a more elongated air inlet gap formed along the longitudinal direction of the rotor shaft can increase the air inlet volume in order to increase the power input. In the turbofan blade structure of the application, at least an overlap area not less than ⅓ of the cross-sectional area of the inward concave surface and not more than ½ of the cross-sectional are of the inward concave surface is provided between two adjacent blades 201, so as to form a relatively closed cavity space on the inner side of the blades for the airflow to repeatedly flow back and forth between the two blade surfaces, thereby repeatedly impacting the inner wall of the blades to provide rotational torque to the transmission shaft 21. The overlap area between the blade structure is set within ⅓ to ½ of the maximum cross-section of the blade, which can ensure that the airflow outside the blade enters the longitudinal gap and more airflow is taken in, and can ensure that the relatively closed cavity space inside can provide enough reflective surfaces to achieve the alternate veering of the airflow direction so as to improve the driving efficiency of the blade structure. Since the airflow direction inside the blade is perpendicular to the transmission shaft 21, the blade connection structure 202 arranged between each blade may adopt an s-shaped or umbrella-shaped plane structure parallel to the plane in which the rotation direction of blade 201 is to reduce the obstruction of the connection structure to the airflow inside the turbofan. More preferably, each blade can also be connected to each other through connection ribs arranged in a staggered manner to achieve fixation and provide a fixed connection to the transmission shaft.

In order to ensure stable output torque to the generator during the complete rotation cycle of the turbofan blade structure, the application preferably configures each blade 201 inside the turbofan blade structure to have the same size and the same material, and the setting angles along the circumferential direction of the transmission shaft between adjacent blades are also installed as the same. The length of each blade 201 along the direction of the transmission shaft 21 is greater than its width along the rotation circumference to expand the air inlet area. The longitudinal air inlet gap between each blade 201 on the outside away from the transmission shaft 21, can provide air inlet space during the first half cycle of the blade rotation and provide an air exhaust channel when it rotates to the back side of the air inlet direction.

The above blade structure can be configured with its rotation axis perpendicular to the ground to obtain as much airflow as possible to improve its driving efficiency. The application may further adopt the method on the right side of FIG. 3 to provide a one-way drive device 23 capable of receiving the driving torque of the turbofan blade structure 2 unidirectionally between the transmission shaft and the internal rotor drive shaft connected to the generator. The one-way drive device 23 can be arranged between the end of the transmission shaft 21 and the speed control mechanism 22 such as the reducer casing and the transmission belt, and can also be arranged between the generator rotor drive shaft and the speed control mechanism such as the reducer casing and the transmission belt, the one-way drive device outputs the torque generated by the rotation of the turbofan blade structure 2 to the generator 3 unidirectionally, and when the rotor speed of the generator 3 exceeds the current corresponding speed of the turbofan blade structure 2, it disconnects the transmission connection with the turbofan blade structure 2, so as to avoid the power loss of the generator caused by the reverse driving of the blade by the generator transmission shaft and avoid affecting the power generation efficiency.

With specific reference to FIG. 3, the above one-way drive device 23 comprises:

a blade drive layer 231 that can be fixedly connected to the transmission shaft 21 at a bottom of the turbofan blade structure 2, is driven by the transmission shaft 21, and is driven by the real-time speed of the turbofan blade structure 2 to rotate synchronously;

a motor transmission layer 232 that is preferably arranged inside the blade drive layer 231, and may also be arranged outside the blade drive layer 231, however, considering that a laborious lever will be formed between the outer motor transmission layer 232 and the inner blade drive layer 231 during the transmission process, which will affect the transmission efficiency, the motor transmission layer 232 is generally arranged internally to forms a labor-saving lever with the blade drive layer 231 to drive the generator rotor coaxially;

an inner coupling elastic member 233 that protrudes from the outer peripheral surface of the motor transmission layer 232, wherein its bottom is elastically connected to the motor transmission layer 232 by springs, shrapnel, etc., at the same time, its top is configured to abut against an inner circumference of the blade drive layer 231 when the torque output generated by the rotation of the turbofan blade structure 2 is output unidirectionally to the generator 3 so as to provide torque output to the rotor drive shaft of the generator, and when the rotor speed of the generator 3 exceeds the corresponding speed of the turbofan blade structure 2, it slides along the inner circumference of the blade drive layer 231, and retracts inwardly or rebounds back and forth along the inner circumference of the blade drive layer 231, it disconnects the transmission connection with the turbofan blade structure 2 by sliding and skidding, so as to avoid the power loss of the generator caused by the reverse drive of the blade by the generator transmission shaft and avoid affecting the power generation efficiency;

cooperating with the above-mentioned inner coupling elastic member 233, the application also provides a circle of outer one-way coupling members 234 evenly arranged along the inner circumference of the blade driving layer 231, it has a wedge-shaped protrusion along the rotation direction of the turbofan blade structure 2, the wedge-shaped projection is capable of unidirectionally abutting against the inner coupling elastic member 233 to output the torque generated by the rotation of the turbofan blade structure 2 to the generator 3 by abutting against and cooperating with a top of the inner coupling elastic member 233 when the speed of the turbofan blade structure is high enough to provide drive output, and when the rotor speed of the generator 3 exceeds the corresponding speed of the turbofan blade structure 2, the top of the inner coupling elastic member 233 reversely slides unidirectionally from a top of the wedge-shaped protrusion to its bottom, so as to avoid generating reverse damped output to the rotor drive shaft of the generator.

For the arrangement of the rotor drive shaft perpendicular to the direction of airflow on the road shown in FIG. 3, the outer circumference of the blade drive layer 231 can be set in a smooth circular form, and the transmission shaft 21 can be directly welded to the end or outer wall to achieve the one-way synchronous transmission with the turbofan blade structure;

for the arrangement of the rotor drive shaft parallel to the ground, the outer circumference of the blade drive layer 231 can be configured to have a bevel gear to achieve the transmission with the end of the transmission shaft 21, so that the output torque of the perpendicular transmission shaft is translated to the torque output of the rotor drive shaft arranged parallel to the road, thereby achieve one-way synchronous transmission with the turbofan blade structure.

Referring to FIG. 3, in a more preferred embodiment, in order to improve power generation efficiency, the application preferably sets the generator 3 in the air pressure-driven power generation system as a self-excited constant voltage generator, which comprises the following as shown in FIG. 3:

an excitation stator coil 33 arranged on one end of generator, and fixedly arranged on the outer circumference of generator 3;

a main generator stator coil 32 arranged on the other end of generator, and fixedly arranged on the outer circumference of generator 3;

an excitation rotor arranged on one end of the generator, wherein its excitation current is controlled by excitation rectifier bridge, and it is driven by the speed control mechanism 22 to operate synchronously with rotor drive shaft in excitation stator coil;

a main generator rotor arranged on the other end of the generator, wherein its current is adjusted according to the magnitude of the excitation stator coil current by the main rotor rectifier bridge, and it is driven by the speed control mechanism 22 to operate synchronously with the rotor drive shaft in the main generator stator coil;

a fan arranged on the front end of main generator rotor to provide heat dissipation;

a rotating rectifier module 31 coaxially arranged between the excitation rotor and a rotor of the main generator, electrically connected to the excitation rotor as well as the rotor of the main generator and maintaining in synchronous operation, both the excitation rectifier bridge 34 and the main rotor rectifier bridge 35 being arranged in the rotating rectifier module 31;

an excitation device automatic control system 36 connected to the rotating rectifier module 31, and adjusting the excitation current of the excitation rectifier bridge according to the output voltage of the main generator stator, so as to keep the output voltage of the self-excited constant voltage generator stable.

Figure 4:
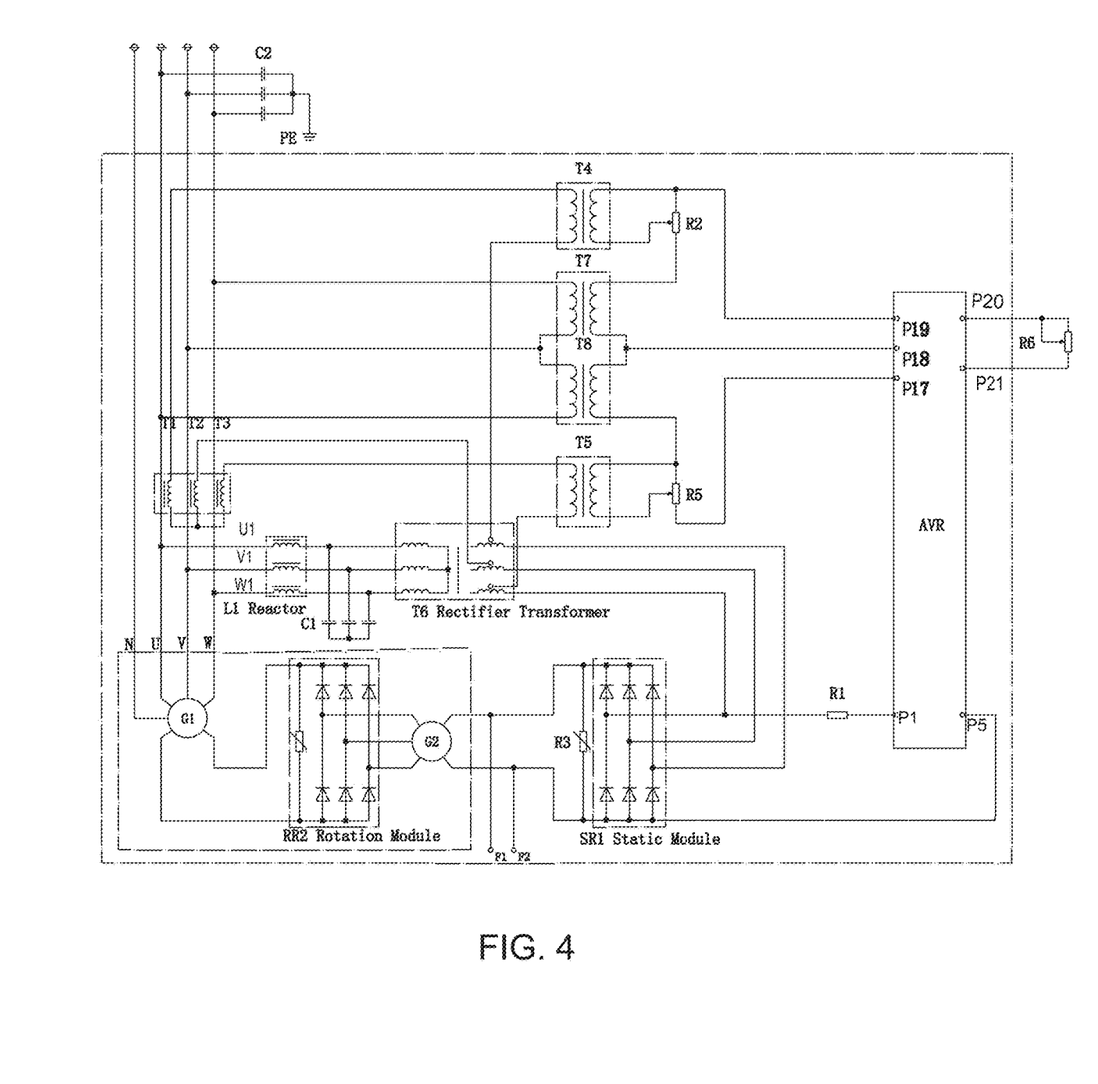
FIG. 4 is a schematic diagram of the generator control circuit performed in the application.

During implementing, self-excited constant-voltage generator is consisting of mainframe G1 and exciter G2, and the field winding of mainframe is powered by three-phase rotating three-phase bridge rectifier RR2 of excitation generator, and exciter is excited by excitation system. The excitation system is composed of an excitation device and a thyristor voltage regulator. The excitation current of the mainframe is supplied by the excitation device, and its power supply circuit comprises the following as shown in FIG. 4:

sampling transformers T1, T2, T3 connected to main generator stator coil output terminal, and sampling the voltage;

signal comparison transformers T4, T5 connected to the sampling transformer, comparing deviation value of voltage of the main generator stator coil output terminal;

a constant voltage control chip AVR connected to the signal comparison transformer, and outputting adjustment signal according to the deviation value;

a thyristor connected on the main excitation circuit between the constant voltage control chip AVR and excitation rectifier bridge, and regulating the excitation current through R1 on the main excitation circuit off the chip according to adjustment signal.

The working process is as follows: the excitation device is connected to the stator coil output terminals U1, V1, and W1 of the main generator G1, and is connected in parallel with the resonant capacitor C1 through the phase-shifting reactor L1 to generate voltage resonance; the input is connected to the primary winding of the rectifier transformer T6, and connected in parallel with the resonant capacitor C1 to generate voltage resonance; then the voltage is output by the secondary winding of the rectifier transformer T6 to the static rectifier SR1 in the excitation device, and the DC voltage is output to both ends of the excitation system set F1 and F2 of the exciter C2. In order to prevent the surge voltage breakdown of the static rectifier SR1, the static varistor R3 is connected to its "+" and "−" output terminals. The excitation stator coil winding of the exciter G2 generates a magnetic field when a current passes through it, when the wind kinetic energy drives the rotor of the main generator G1 to rotate, a three-phase induced voltage is generated on the three-phase winding on the rotor, which is rectified by the rotating rectifier RR2 and then output to the field winding of the main generator G1, the rotating magnetic field is generated to generate a higher three-phase AC voltage in the three-phase stator winding of the main generator G1, which is output through the wirings U1, V1, W1, and N.

Figure 5:
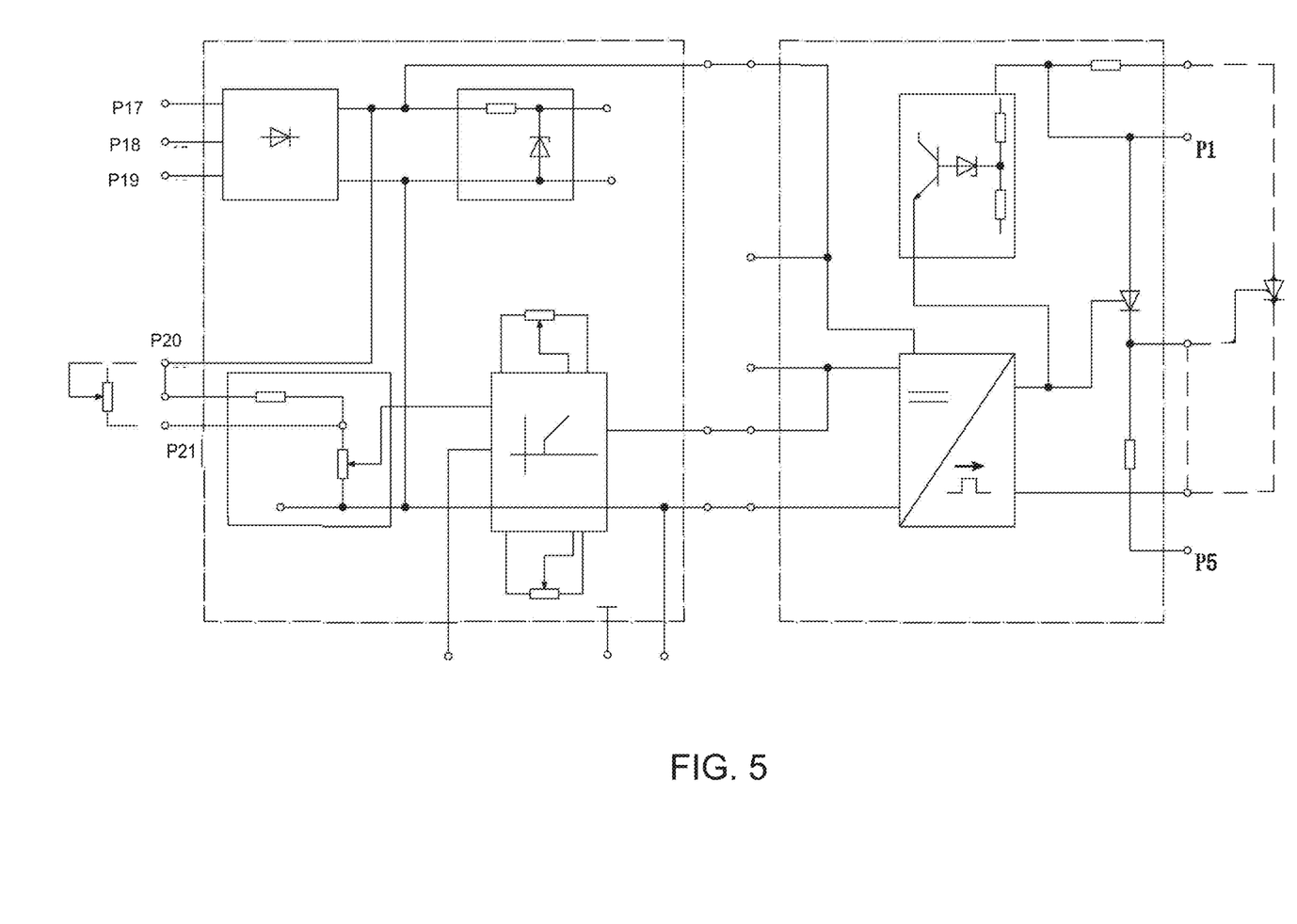
FIG. 5 is a schematic diagram of the constant voltage control chip AVR in FIG. 4.

The voltage level of the three-phase terminals of the generator increases with the increase of the voltage at both terminals F1 and F2. In order to ensure that the generator terminal voltage is stable and invariant, it should be ensured that when the generator speed increases or the load of the generator decreases, the excitation current should be reduced accordingly; or when the speed of the generator drops (large deviation from the rated value) and the load of the generator increases, the excitation current should be increased accordingly. The output voltage of the generator can be kept unchanged through the dynamic adjustment of the AVR chip in the case of the above two variations in operating conditions. As illustrated in FIG. 4, pins P1 and P5 of AVR are connected to R1 and static module SR1, respectively, pins P20 and P21 are connected to a variable resistor R6, and pins P17, P18 and P19 of AVR are connected to R5, T7 and R2, respectively. Further details of circuitry of AVR are illustrated in the schematics shown in FIG. 5.

The turbofan blade structure adopted in the power generation unit of the application is set to a half-enclosed form, each blade is configured with an inward concave curved surface structure, and ⅓ to ½ of the area of each blade overlaps with each other. The airflow in the natural environment or the external pressure generated by the operation of the carrier device enters the turbofan blade structure through the longitudinal air inlet gap outside the blade, and then reciprocates between the inner walls of several blades, impacts the inner wall of each blade, and finally is discharged from the longitudinal gap on the other side. Therefore, the turbofan blade structure of the application can utilize the impact of the internal airflow to increase the output torque to the transmission shaft, thereby driving the rotor of the generator to operate with a relatively small pressure or airflow to achieve power output. In addition, the turbofan blade structure of the application is not easily affected by airflow disturbance, and the airflow between adjacent blades does not affect the driving of the blades, so they can be arranged at a relatively short distance to improve the utilization efficiency of environmental wind energy. This application can be flexibly installed in squares, airport aprons, building exteriors, green areas, farmland surroundings, open areas, etc., and can be driven by natural wind to generate power, it can also be driven by the airflow generated by the operation of surrounding trains, airplanes, and automobiles to achieve wind power conversion.

The generator of this application specifically adopts a self-excited constant voltage generator, which has higher power generation efficiency, and can dynamically compare the deviation value of the output terminal voltage of the main generator stator coil through the automatic control system according to the output terminal voltage of the main generator stator coil, and according to the deviation value, the excitation current of the excitation rectifier bridge is adjusted through the thyristor to keep the output voltage of the self-excited constant voltage generator stable. This application can supply power for various types of power-consuming equipment, achieve the reuse of air resistance, and achieve sustainable self-generation of wind power, convert small airflows into usable electrical energy, effectively supplying street lamps, charging piles and other road power-consuming equipment, or auxiliary lighting equipment and bird repelling devices in the airport, or feeding into the grid to save urban electricity.

The above is only the embodiments of the application, and its description is comparatively specific and detailed, but cannot therefore be interpreted as the limitation to the scope of the application. It should be noted that those skilled in the art can make several modifications and improvements without departing from the concept of the present application, and these all belong to the protection scope of the present application.

The invention claimed is:

1. A wind power generation system, comprising:
   a turbofan blade structure (2) having a transmission shaft (21) perpendicular to a direction of environment airflow, the turbofan blade structure (2) being driven by the environment airflow to rotate with the transmission shaft (21) as a rotation center;
   a speed control mechanism (22), one end of the speed control mechanism (22) being connected to the transmission shaft (21) and the other end driven by the transmission shaft (21) and outputting torque;
   a generator (3), a rotor drive shaft of the generator being connected to the speed control mechanism (22), and driven by an output torque of the speed control mechanism to generate power;
   an indicator (6) including a switch that is connected between the generator (3) and a cable (10) to connect and disconnect a power output path between the generator and the cable;
   wherein the generator (3) comprises an excitation device automatic control system connected between a main generator stator coil and an excitation rotor controlling a self-excited constant voltage, regulating an excitation current of a rectifier bridge connected to the excitation rotor according to a deviation value of an output voltage of the main generator stator coil and keeping the output voltage of the self-excited constant voltage generator stable.

2. The wind power generation system according to claim 1, further comprises:
   a power storage device (5) connected to the cable (10) for receiving and storing power output by the generator (3);
   a diverter (8) connected to a power output terminal of the power storage device (5), routing power to a power-consuming equipment (7).

3. The wind power generation system according to claim 1, wherein the indicators (6) that are connected to respective generator (3) are connected in series by the cables (10), and an isolating protective switch (9) is also connected in series in the cables (10).

4. The wind power generation system according to claim 1, wherein the turbofan blade structure, fixedly connected to the transmission shaft (21), comprises:
   at least two blades arranged oppositely concaved wherein a cavity is formed and enclosed by the blades,
   wherein the blades are driven by the airflow driving the transmission shaft (21);
   wherein a blade connection structure (202) surrounded by the blades (201) and connected between each blade (201) of the at least two blades.

5. The wind power generation system according to claim 4, wherein the at least two blades are configured with an inward concave curved surface, and a first inward concave curvature along a rotation center direction of the transmission shaft (21);
   wherein the at least two blades are also configured with a second inward concave curvature along a rotation circumference of the transmission shaft (21), and
   wherein the second inward concave curvature is not less than the first inward concave curvature.

6. The wind power generation system according to claim 5, wherein the turbofan blade structure is further connected to the generator (3) with a one-way drive device (23), the one-way drive device (23) comprising:
   a blade drive layer (231) driven by the transmission shaft (21) at a bottom of the turbofan blade structure (2), and synchronized with a speed of the turbofan blade structure (2);
   a motor transmission layer (232) arranged within the blade drive layer (231), coaxial with the blade drive layer (231) and driving a generator rotor;
   an inner coupling elastic member (233) protruding from an outer circumference surface of the motor transmission layer (232), wherein a bottom of the inner coupling elastic member is elastically connected to the motor transmission layer (232), and a top of the inner coupling elastic member abuts against an inner circumference of the blade drive layer (231) when the speed of the turbofan blade structure exceeds the speed of the motor transmission layer, and when the speed of the motor transmission layer exceeds the corresponding speed of the turbofan blade structure (2), the top of the inner coupling elastic member retracts inwardly or bounces back and forth along the inner circumference of the blade drive layer (231), slides relatively with the blade drive layer (231) and disconnects the transmission connection of the turbofan blade structure (2); and
   an outer one-way coupling member (234) evenly arranged along the inner circumference of the blade drive layer (231), having a wedge-shaped projection along the rotation direction of the turbofan blade structure (2), wherein the wedge-shaped projection abuts against the top of the inner coupling elastic member (233) when the speed of the turbofan blade structure exceeds the speed of the motor transmission layer, and the top of the inner coupling elastic member (233) slides unidirectionally from a top of the wedge-shaped protrusion to its bottom when the speed of the motor transmission layer exceeds the corresponding speed of the turbofan blade structure (2).

7. The wind power generation system according to claim 4, wherein the blade connection structure (202) is a plane or a connection rib parallel to a rotation direction of the blades (201).

8. The wind power generation system according to claim 7, wherein the turbofan blade structure is further connected to the generator (3) with a one-way drive device (23), the one-way drive device (23) comprising:
a blade drive layer (231) driven by the transmission shaft (21) at a bottom of the turbofan blade structure (2), and synchronized with a speed of the turbofan blade structure (2);
a motor transmission layer (232) arranged within the blade drive layer (231), coaxial with the blade drive layer (231) and driving a generator rotor;
an inner coupling elastic member (233) protruding from an outer circumference surface of the motor transmission layer (232), wherein a bottom of the inner coupling elastic member is elastically connected to the motor transmission layer (232), and a top of the inner coupling elastic member abuts against an inner circumference of the blade drive layer (231) when the speed of the turbofan blade structure exceeds the speed of the motor transmission layer, and when the speed of the motor transmission layer exceeds the corresponding speed of the turbofan blade structure (2), the top of the inner coupling elastic member retracts inwardly or bounces back and forth along the inner circumference of the blade drive layer (231), slides relatively with the blade drive layer (231) and disconnects the transmission connection of the turbofan blade structure (2); and
an outer one-way coupling member (234) evenly arranged along the inner circumference of the blade drive layer (231), having a wedge-shaped projection along the rotation direction of the turbofan blade structure (2), wherein the wedge-shaped projection abuts against the top of the inner coupling elastic member (233) when the speed of the turbofan blade structure exceeds the speed of the motor transmission layer, and the top of the inner coupling elastic member (233) slides unidirectionally from a top of the wedge-shaped protrusion to its bottom when the speed of the motor transmission layer exceeds the corresponding speed of the turbofan blade structure (2).

9. A wind power generation system, comprising:
a turbofan blade structure (2) having a transmission shaft (21) perpendicular to a direction of environment airflow, the turbofan blade structure (2) being driven by the environment airflow to rotate with the transmission shaft (21) as a rotation center;
a speed control mechanism (22), one end of the speed control mechanism (22) being connected to the transmission shaft (21) and the other end driven by the transmission shaft (21) and outputting torque;
a generator (3), a rotor drive shaft of the generator being connected to the speed control mechanism (22), and driven by an output torque of the speed control mechanism to generate power;
an indicator (6) including a switch that is connected between the generator (3) and a cable (10) to connect and disconnect a power output path between the generator and the cable;
wherein the turbofan blade structure, fixedly connected to the transmission shaft (21), comprises at least two blades arranged oppositely concaved;
wherein a cavity is formed and enclosed by the blades;
wherein the blades are driven by the airflow driving the transmission shaft (21); and
wherein a blade connection structure (202) surrounded by the blades (201) and connected between each blade (201) of the at least two blades.

10. The wind power generation system according to claim 9, further comprises:
a power storage device (5) connected to the cable (10) for receiving and storing power output by the generator (3);
a diverter (8) connected to a power output terminal of the power storage device (5), routing power to a power-consuming equipment (7).

11. The wind power generation system according to claim 9, wherein the indicators (6) that are connected to respective generator (3) are connected in series by the cables (10), and an isolating protective switch (9) is also connected in series in the cables (10).

12. The wind power generation system according to claim 9, wherein the at least two blades are configured with an inward concave curved surface and a first inward concave curvature along a rotation center direction of the transmission shaft (21);
wherein the at least two blades are also configured with a second inward concave curvature along a rotation circumference of the transmission shaft (21), and
wherein the second inward concave curvature is not less than the first inward concave curvature.

13. The wind power generation system according to claim 12, wherein the turbofan blade structure is further connected to the generator (3) with a one-way drive device (23), the one-way drive device (23) comprising:
a blade drive layer (231) driven by the transmission shaft (21) at a bottom of the turbofan blade structure (2), and synchronized with a speed of the turbofan blade structure (2);
a motor transmission layer (232) arranged within the blade drive layer (231), coaxial with the blade drive layer (231) and driving a generator rotor;
an inner coupling elastic member (233) protruding from an outer circumference surface of the motor transmission layer (232), wherein a bottom of the inner coupling elastic member is elastically connected to the motor transmission layer (232), and a top of the inner coupling elastic member abuts against an inner circumference of the blade drive layer (231) when the speed of the turbofan blade structure exceeds the speed of the motor transmission layer, and when the speed of the motor transmission layer exceeds the corresponding speed of the turbofan blade structure (2), the top of the inner coupling elastic member retracts inwardly or bounces back and forth along the inner circumference of the blade drive layer (231), slides relatively with the blade drive layer (231) and disconnects the transmission connection of the turbofan blade structure (2); and
an outer one-way coupling member (234) evenly arranged along the inner circumference of the blade drive layer (231), having a wedge-shaped projection along the rotation direction of the turbofan blade structure (2), wherein the wedge-shaped projection abuts against the top of the inner coupling elastic member (233) when the speed of the turbofan blade structure exceeds the speed of the motor transmission layer, and the top of the inner coupling elastic member (233) slides unidirectionally from a top of the wedge-shaped protrusion to its bottom when the speed of the motor transmission layer exceeds the corresponding speed of the turbofan blade structure (2).

14. The wind power generation system according to claim 9, wherein the blade connection structure (202) is a plane or a connection rib parallel to a rotation direction of the blades (201).

15. The wind power generation system according to claim 14, wherein the turbofan blade structure is further connected to the generator (3) with a one-way drive device (23), the one-way drive device (23) comprising:
- a blade drive layer (231) driven by the transmission shaft (21) at a bottom of the turbofan blade structure (2), and synchronized with a speed of the turbofan blade structure (2);
- a motor transmission layer (232) arranged within the blade drive layer (231), coaxial with the blade drive layer (231) and driving a generator rotor;
- an inner coupling elastic member (233) protruding from an outer circumference surface of the motor transmission layer (232), wherein a bottom of the inner coupling elastic member is elastically connected to the motor transmission layer (232), and a top of the inner coupling elastic member abuts against an inner circumference of the blade drive layer (231) when the speed of the turbofan blade structure exceeds the speed of the motor transmission layer, and when the speed of the motor transmission layer exceeds the corresponding speed of the turbofan blade structure (2), the top of the inner coupling elastic member retracts inwardly or bounces back and forth along the inner circumference of the blade drive layer (231), slides relatively with the blade drive layer (231) and disconnects the transmission connection of the turbofan blade structure (2); and
- an outer one-way coupling member (234) evenly arranged along the inner circumference of the blade drive layer (231), having a wedge-shaped projection along the rotation direction of the turbofan blade structure (2), wherein the wedge-shaped projection abuts against the top of the inner coupling elastic member (233) when the speed of the turbofan blade structure exceeds the speed of the motor transmission layer, and the top of the inner coupling elastic member (233) slides unidirectionally from a top of the wedge-shaped protrusion to its bottom when the speed of the motor transmission layer exceeds the corresponding speed of the turbofan blade structure (2).

16. The wind power generation system according to claim 9, wherein the generator (3) comprises an excitation device automatic control system connected between a main generator stator coil and an excitation rotor controlling a self-excited constant voltage, regulating an excitation current of a rectifier bridge connected to the excitation rotor according to a deviation value of an output voltage of the main generator stator coil and keeping the output voltage of the self-excited constant voltage generator stable.

\* \* \* \* \*